UNITED STATES PATENT OFFICE.

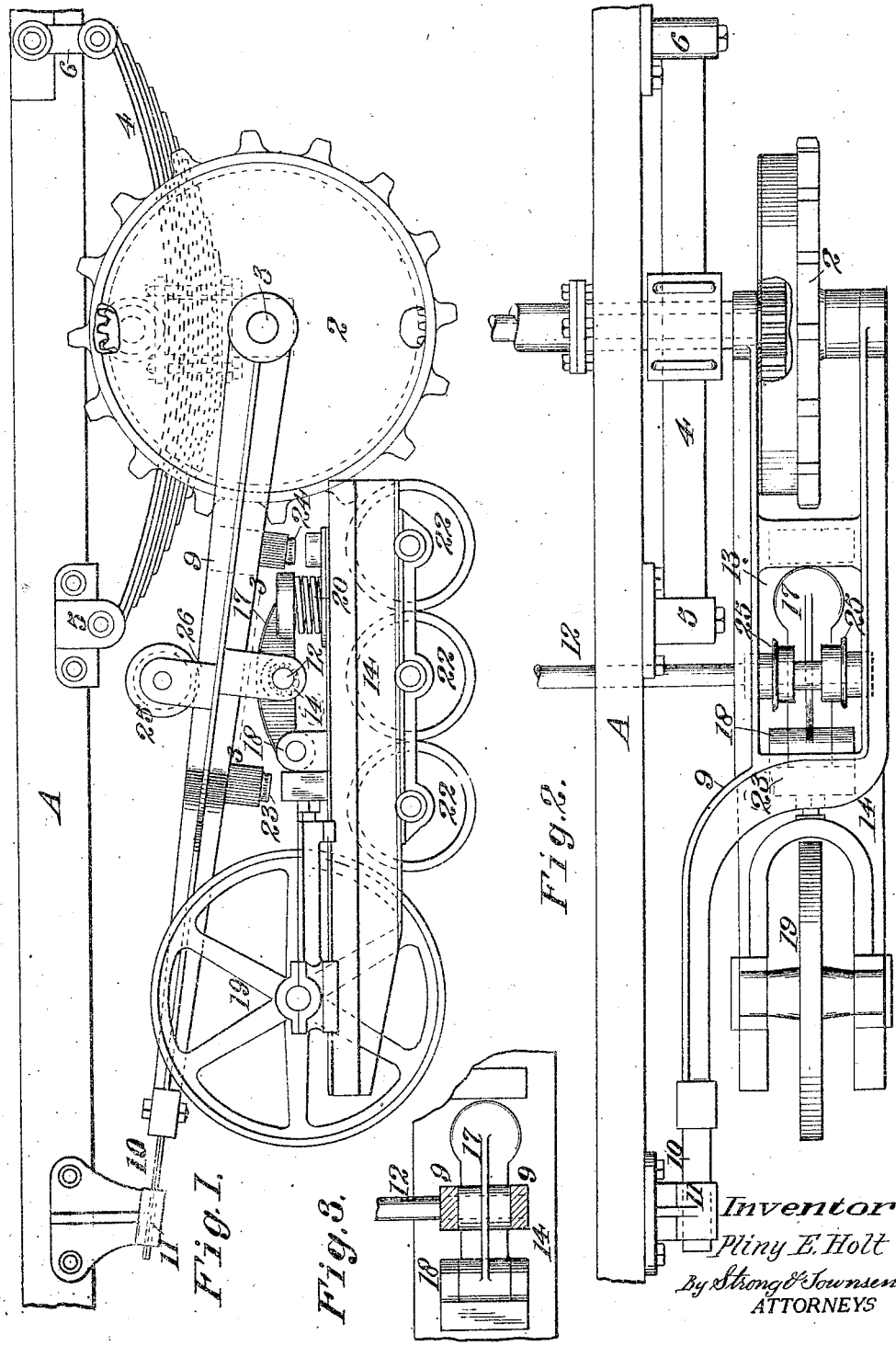

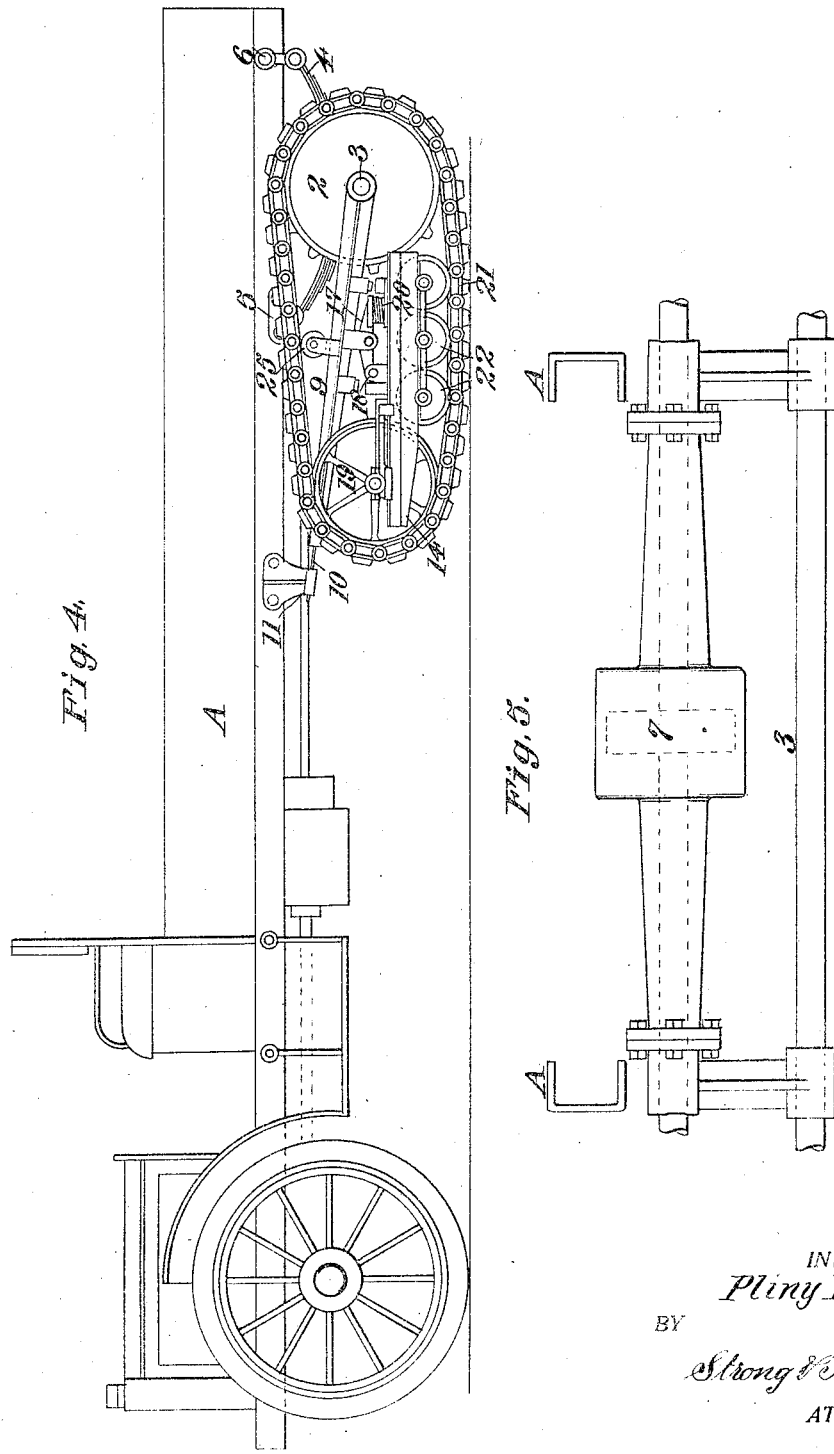

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

TRUCK-ADAPTER.

1,317,651.          Specification of Letters Patent.          Patented Sept. 30, 1919.

Application filed May 20, 1918. Serial No. 235,641.

*To all whom it may concern:*

Be it known that I, PLINY E. HOLT, a citizen of the United States, residing at Stockton, in the county of San Joaquin and State of California, have invented new and useful Improvements in Truck-Adapters, of which the following is a specification.

This invention relates to a tractor attachment for auto trucks; the object being to adapt a chain track attachment to trucks of the conventional four-wheel drive type.

The invention generally comprehends a sprocket axle mounted on the rear main springs of the truck, conforming in location to the rear axle of the regular truck drive. There are two cantalivers extending forwardly from the truck axle and pivoted to the main frame of the truck. The cantalivers on each side of the machine are connected together at points between their ends by a crosswise extending pivot shaft, to which shaft are also pivotally connected the trucks which run on the endless chain tracks; these trucks each carrying a front idler which coöperates with a respective rear drive sprocket in guiding and supporting the chain tracks. In order to provide the necessary cushioning action, suitable yieldable connections are interposed at the point of articulation between the trucks and cantalivers.

The invention further comprehends details of construction which will be more fully set out hereinafter.

Having reference to the accompanying drawings:

Figure 1 is a side elevation of the truck adapter.

Fig. 2 is a plan view of the same.

Fig. 3 is a horizontal section on line 3—3 of Fig. 1.

Fig. 4 is a side elevation of a truck showing the adapter applied.

Fig. 5 is a detail cross section through the truck frame, showing the driving and supporting shaft and also the differential case.

A represents a conventional truck, to which the invention is applicable, these trucks being in practice generally of the four-wheel drive type. 2 is an internal gear drive rear track sprocket mounted on the axle 3, which in turn is mounted on the rear main springs 4 of the truck and conforms in location to the rear axle of the regular truck drive. The springs 4 are suitably pivoted at the front end to the main frame, as shown at 5, and at the rear are shackled, as at 6. The sprockets on each side of the machine are driven in conventional fashion by the usual differential drive indicated at 7.

Pivoting on shaft 3 and embracing the sprocket 2 is a forwardly extending forked cantaliver 9 which has a suitable yielding connection 10 at its forward end with the main frame. As here shown, this connection 10 comprises a flat steel spring forming part of the cantaliver which is slidably held in the stirrup 11 on the frame. It is understood that there is one of these cantalivers, with its complementary parts, on each side of the machine. The two cantalivers are pivotally connected crosswise beneath the truck frame by a pivot shaft 12, the journals for this shaft being substantially central of the length of the cantalivers.

The cantalivers have a central opening 13 around the shaft, through which opening the roller bearing trucks 14 are pivotally hung on the shaft 12 through the medium of a bracket 17. These brackets 17, which are mounted on the end of the shaft 12 and which connect this cross shaft with the trucks, are hinged at their forward ends to the truck frames at 18, just back of the front idler 19; the rear end of each bracket being supported on a coil spring 20 on the rear of the truck frame, thus giving a cushioning effect between the truck frame and the weight-carrying axle or shaft 12.

The chain track, represented at 21, passes over the rear sprocket 2 and front idler 19 and beneath the rollers 22 of the truck 14. Thus it will be seen that each truck 14, together with the front sprocket 19 and chain track, is free to oscillate on the pivot shaft 12 within the limits permitted by the front and rear buffers 23—24. 25 is a roller carried by a bracket 26 mounted on the cantaliver for supporting the upper run of the chain track.

The idea of interposing the yielding spring connection between a cantaliver and its truck, which connections are represented by the pivoted bracket 17 and its spring 20, is to interpose a cushion to remove the necessity of lifting the truck frame when going over small obstructions in the road and to reduce the crystallizing effects of the shocks on the supporting members.

It is obvious that various changes may be made in the details of construction and in the form and proportions of the parts without in any wise departing from the spirit of the invention.

Having thus described my invention, what I claim and desire to secure by Letters Patent is—

1. In a tractor attachment for trucks, the combination of a rear spring-supported axle, a sprocket mounted thereon, a cantaliver pivoted on the sprocket axle and extending forwardly and connected with the main frame, a truck pivoted on the cantaliver, a front idler in line with the sprocket and carried by the truck, and an endless chain track embracing the truck, rear sprocket and front idler.

2. In a vehicle, the combination of a main frame, an axle, a sprocket thereon, a cantaliver member pivoted at one end on the sprocket axle and having its other end yieldingly connected with the main frame, a truck pivotally hung on the cantaliver between the ends of the latter, a front idler in line with the rear sprocket, and an endless chain track embracing the sprocket, front idler and truck.

3. In a vehicle, the combination of a main frame, an axle, a sprocket thereon, a cantaliver member pivoted at one end on the sprocket axle and having its other end yieldingly connected with the main frame, a truck pivotally hung on the cantaliver between the ends of the latter, a front idler in line with the rear sprocket, an endless chain track embracing the sprocket, front idler and truck, and means providing yielding connections between the truck and the cantaliver.

4. In a vehicle, the combination of a main frame, an axle, a sprocket thereon, a cantaliver fulcruming on the sprocket axle having at its forward end a spring connection with the main frame, a roller truck yieldingly connected having a limited pivotal movement on the cantaliver between the ends of the latter, a front idler, and an endless chain track embracing the truck, sprocket and front idler.

5. In a vehicle, the combination of a main frame with conventional semi-elliptical main springs, a shaft connected with the main springs, a drive sprocket on the shaft, means for driving the sprocket, a cantaliver fulcruming on the sprocket shaft and extending forwardly to a connection with the main frame, a truck pivoting on the cantaliver, a front idler on the truck, and an endless chain track embracing the truck, drive sprocket and front idler.

6. In a vehicle, the combination of a main frame with conventional semi-elliptical main springs, a shaft connected with the main springs, a drive sprocket on the shaft, means for driving the sprocket, a cantaliver fulcruming on the sprocket shaft and extending forwardly to a connection with the main frame, a truck pivoting on the cantaliver, a front idler on the truck, an endless chain track embracing the truck, drive sprocket and front idler, and means providing yielding connections between the truck and cantaliver.

7. In a vehicle, the combination of a main frame with conventional semi-elliptical main springs, a shaft connected with the main springs, a drive sprocket on the shaft, means for driving the sprocket, a cantaliver fulcruming on the sprocket shaft and extending forwardly to a connection with the main frame, a truck pivoting on the cantaliver, a front idler on the truck, an endless chain track embracing the truck, drive sprocket and front idler, and means providing yielding connections between the truck and cantaliver, said last-named means including a bracket having one end pivoted on the truck and the rear end spring-supported on the truck.

8. In a vehicle, the combination of a main frame with conventional semi-elliptical main springs, a shaft connected with the main springs, a drive sprocket on the shaft, means for driving the sprocket, a cantaliver fulcruming on the sprocket shaft and extending forwardly to a connection with the main frame, a truck pivoting on the cantaliver, a front idler on the truck, an endless chain track embracing the truck, drive sprocket and front idler, means providing yielding connections between the truck and cantaliver, and a supporting roller carried by the cantaliver for upholding the upper run of the chain track.

9. In a vehicle, the combination of a main frame with conventional semi-elliptical main springs, a shaft connected with the main springs, a drive sprocket on the shaft, means for driving the sprocket, a cantaliver fulcruming on the sprocket shaft and extending forwardly to a connection with the main frame, a truck pivoting on the cantaliver, a front idler on the truck, an endless chain track embracing the truck, drive sprocket and front idler, means providing yielding connections between the truck and cantaliver, and means between the cantaliver and truck for limiting the pivotal movement of the truck on the cantaliver.

10. In a vehicle, the combination of a main frame, a rear axle, springs between the rear axle and main frame for yieldingly supporting the latter on the axle, a drive sprocket at each side of the main frame mounted on said axle, a forwardly extending cantaliver fulcrumed on each end of the axle, the forward ends of the cantalivers connected to the main frame, a cross shaft pivotally connecting the cantalivers between their ends, a pair of trucks pivotally hung from said shaft adjacent to the cantalivers and each truck carrying a front idler and provided with truck rollers, and chain tracks passing around the respective sprockets, idlers and trucks.

11. In a vehicle, the combination of a main frame, a rear axle, springs between the rear axle and main frame for yieldingly supporting the latter on the axle, a drive sprocket at each side of the main frame mounted on said axle, a forwardly extending cantaliver fulcrumed on each end of the axle, the forward ends of the cantalivers connected to the main frame, a cross shaft pivotally connecting the cantalivers between their ends, a pair of trucks pivotally hung from said shaft adjacent to the cantalivers and each truck carrying a front idler and provided with truck rollers, and chain tracks passing around the respective sprockets, idlers and trucks, the trucks and cantalivers having yielding connections whereby a cushioning effect is provided between the trucks and cantalivers.

12. In a vehicle, the combination of a main frame, a rear axle, springs between the rear axle and main frame for yieldingly supporting the latter on the axle, a drive sprocket at each side of the main frame mounted on said axle, a forwardly extending cantaliver fulcrumed on each end of the axle, the forward ends of the cantalivers connected to the main frame, a cross shaft pivotally connecting the cantalivers between their ends, a pair of trucks pivotally hung from said shaft adjacent to the cantalivers and each truck carrying a front idler and provided with truck rollers, and chain tracks passing around the respective sprockets, idlers and trucks, the trucks and cantalivers having yielding connections whereby a cushioning effect is provided between the trucks and cantalivers, said yielding connections including brackets hung on the shafts and extending through openings in the cantalivers, with one end of each bracket pivoted on the truck and the other end spring-supported on the truck.

In testimony whereof I have hereunto set my hand in the presence of two subscribing witnesses.

PLINY E. HOLT.

Witnesses:
 JOHN H. HERRING,
 W. W. HEALEY.